United States Patent [19]

Ohkumo et al.

[11] Patent Number: 4,911,275
[45] Date of Patent: Mar. 27, 1990

[54] SYSTEM FOR CONTROLLING A CLUTCH FOR A VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 275,636

[22] Filed: Nov. 21, 1988

Related U.S. Application Data

[63] Continuation of Ser. No. 35,557, Apr. 7, 1987, abandoned.

[30] Foreign Application Priority Data

Apr. 9, 1986 [JP] Japan ................................ 61-083121

[51] Int. Cl.$^4$ ........................ F16D 37/02; B60K 41/02
[52] U.S. Cl. ................................ 192/0.076; 192/21.5; 192/103 C
[58] Field of Search ............... 192/0.033, 0.052, 0.076, 192/0.092, 0.096, 21.5, 103 R, 103 C

[56] References Cited

U.S. PATENT DOCUMENTS 4,675,817  6/1987  Sakakiyama et al. ........ 192/0.076 X
4,680,712  7/1987  Sakakiyama et al. ........ 192/0.076 X

FOREIGN PATENT DOCUMENTS

151038     8/1985  European Pat. Off. .
57-15024   1/1982  Japan ............................... 192/0.033
60-157930  8/1985  Japan ............................... 192/0.096
61-84422   4/1986  Japan ............................... 192/21.5

Primary Examiner—Leslie A. Braun
Assistant Examiner—Richard M. Lorence
Attorney, Agent, or Firm—Martin A. Farber

[57] ABSTRACT

A system for controlling clutch current of an electromagnetic clutch at acceleration of a vehicle on a downhill. The clutch is engaged when vehicle speed is higher than a first reference speed. When the vehicle is accelerated on a downhill at a speed higher than a second reference speed which is lower than the first reference speed, the clutch is engaged to provide an engine braking effect.

6 Claims, 7 Drawing Sheets

SYSTEM FOR CONTROLLING A CLUTCH FOR A VEHICLE

This application is a continuation of our co-pending application Ser. No. 035,557 filed April 7, 1987 now abandoned.

BACKGROUND OF THE INVENTION

The present invention relates to a system for controlling a clutch for an automatic transmission of a motor vehicle.

An automobile provided with a continuously variable belt-drive transmission with an electromagnetic clutch is disclosed in EP-A No. 151038. The electromagnetic clutch of the transmission is controlled by a control system to provide various operational modes such as a starting mode of a vehicle, reverse excitatior mode, drag mode, and mode of lock-up engagement. One of the modes is selected in accordance with a position of a selector lever and driving conditions to control the electromagnetic clutch.

In the above-described control system, a clutch engaging vehicle speed at which the clutch is engaged is set at a relatively high speed so as to enhance coasting of the vehicle. Accordingly, when the vehicle coasts down a hill at a speed lower than the clutch engaging speed, the vehicle may be acclerated in spite of releasing the accelerator pedal.

Such an acceleration of the vehicle moring downhill critical in ordinary conditions. However, for example, on snowy downhill travel it is desirable for the clutch to be engaged in a low vehicle speed range to effect the engine braking without coasting. Since the clutch engaging vehicle speed is set at a high speed in the convention system, the vehicle is accelerated up to the high speed without engine braking.

Japanese Patent Laid Open 60-157930 proposes a control system wherein once the vehicle speed reaches a speed for the engagement of the clutch during the release of the accelerator pedal (this means coasting downhill), the clutch engaging vehicle speed at which the clutch is engaged is changed to a lower speed. Thus, engine braking is effective at low vehicle speed.

However, in such a system, when the vehicle is acclerated after starting of the vehicle without depressing the accelerator pedal, the clutch is not engaged until the normal high speed. Thus, the vehicle may be accelerated up to the high speed.

SUMMARY OF THE INVENTION

The object of the present invention is to provide a system for controlling an electromagnetic clutch wherein sufficient engine braking effect can be achieved during downhil driving even at low vehicle speed.

The other objects and features of this invention will become understood from the following description with reference to the accompanying drawings.

DETAILED DESCRIPTION OF THE PREFERRED EMBODIMENT

Figure 1:
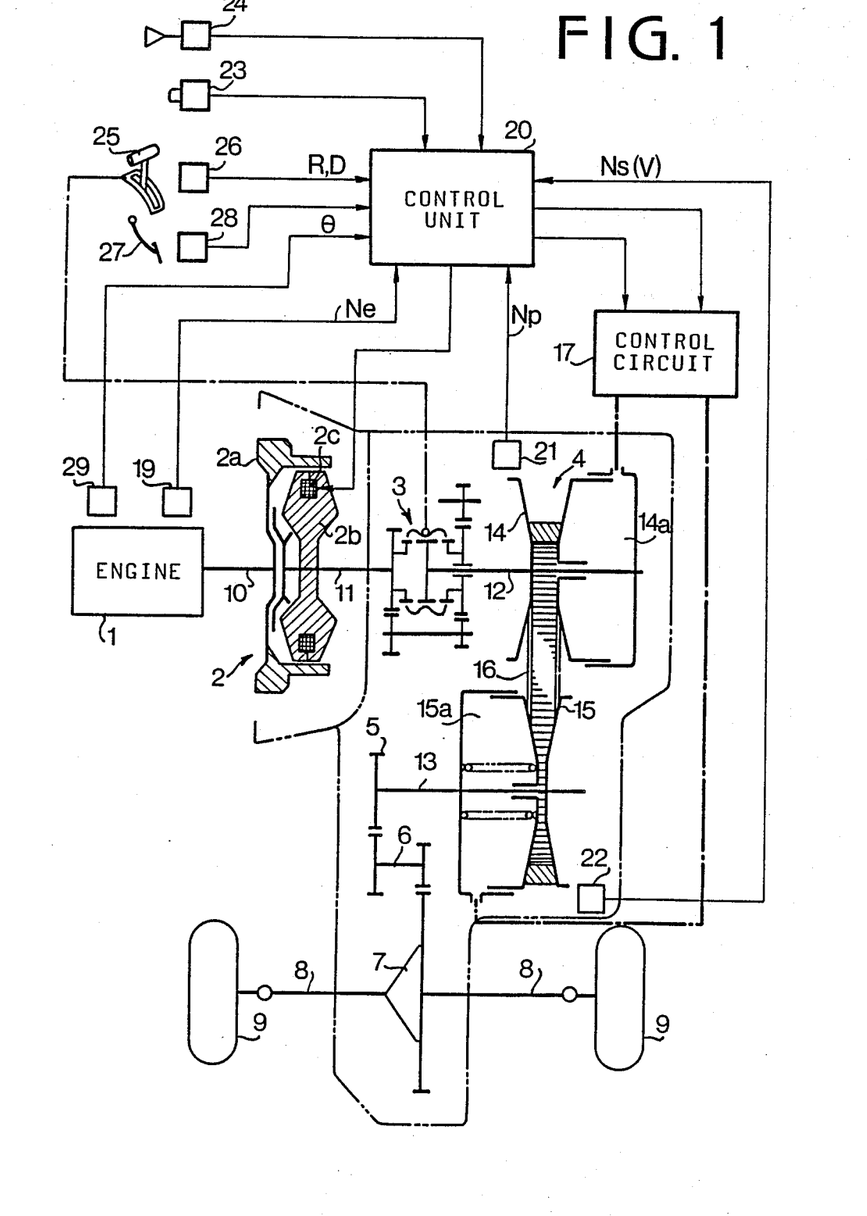
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range) and a reverse driving position (R-range).

The continuously variable belt-drive automatic transmission 4 has the main shaft 12 and an output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing the sppeds of the driven pulley 14 and the driven pulley 15. A choke switch 24 produces an output signal when a choke valve of the engine 1 is closed, and an air conditioner switch 23 produces an output signal during the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signal of the sensors and pulses of the switches are applied to an electronic control unit 20 which produces a clutch current control signal for the clutch 2 and a control signal for controlling the transmission ratio (i) of the transmission and a line pressure control signal for the control circuit 17.

Figure 2A:
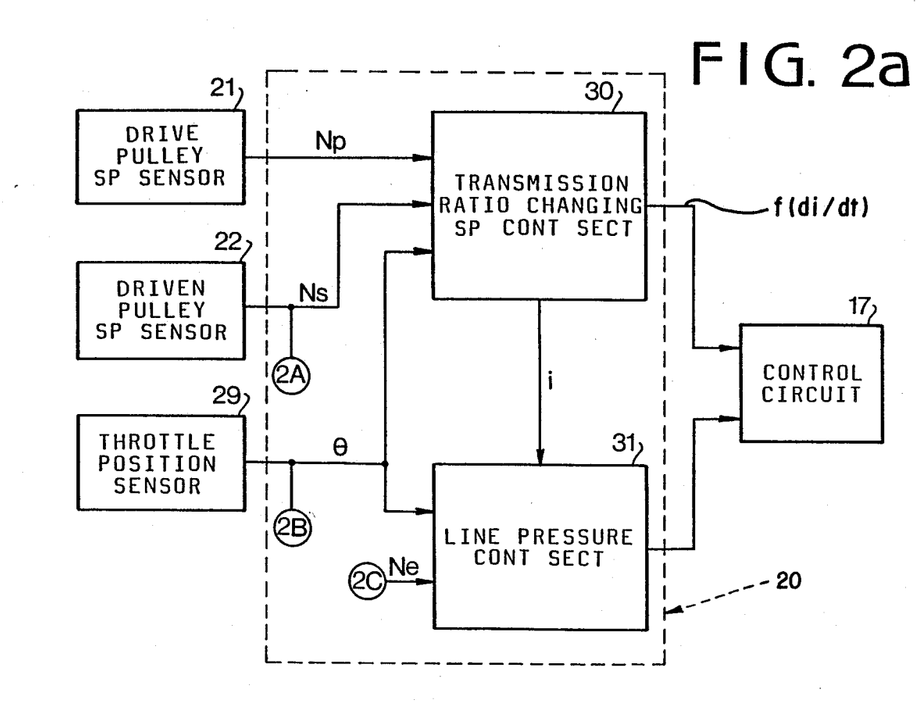
FIGS. 2a and 2b show a block diagram of a control unit according to the present invention.
Figure 2B:
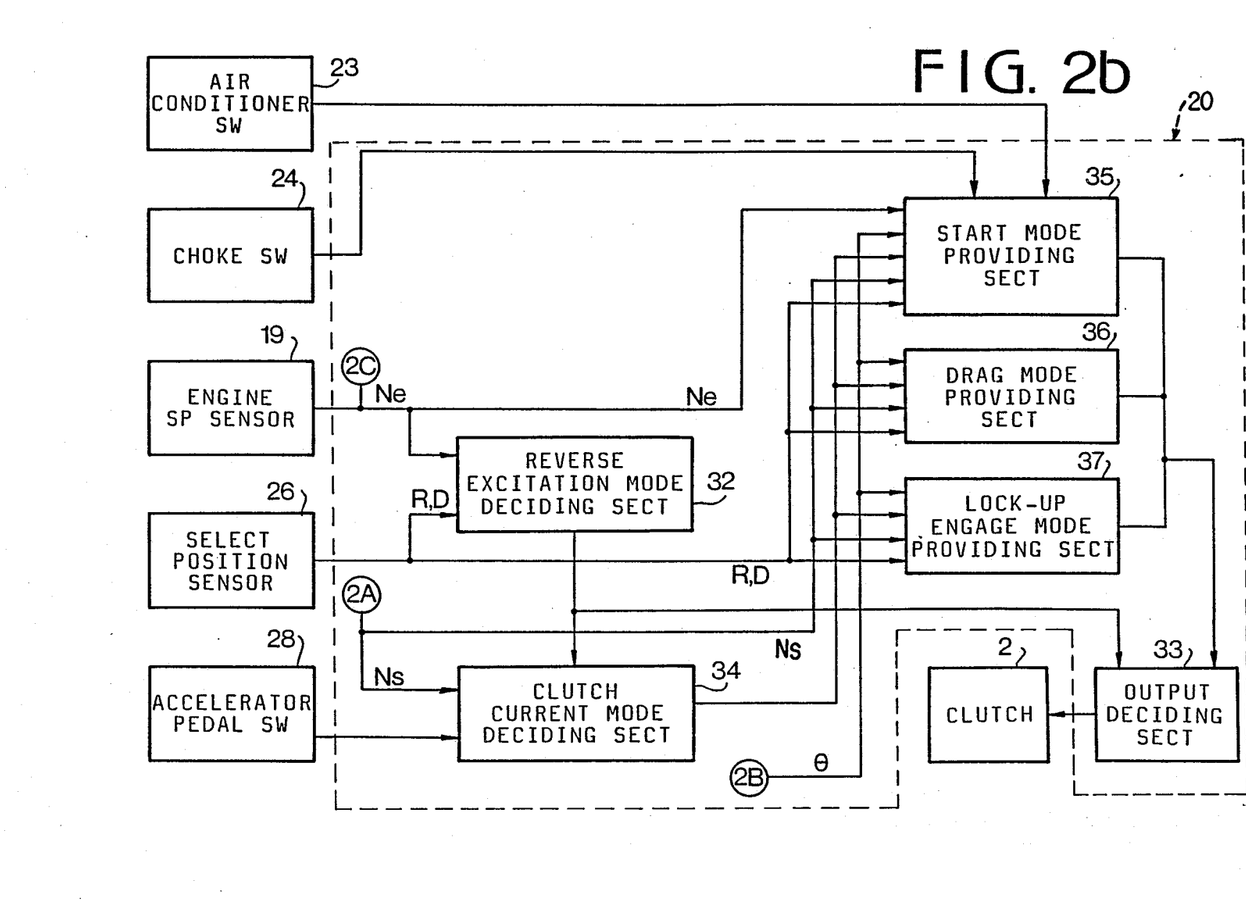

Referring to FIGS. 2a and 2b showing the control unit 20 of FIG. 1, a transmission ratio changing speed control section 30 is applied with a drive pulley speed signal $N_P$ of the sensor 21, driven pulley speed signal Ns of the sensor 22, and throttle position signal $\theta$ of the sensor 29 to produce the transmission ratio control signal f(di/dt) dependent on a transmission ratio changing speed (rate). A line pressure control section 31 is applied with an engine speed signal Ne of the sensor 19, throttle position signal $\theta$ of the sensor 29, and an actual transmission speed ration signal i ($N_S/N_P$) which is produced in a transmission ratio determining section of the transmission ratio changing speed control section 30 to produce the line pressure control signal dependent on a desired line pressure. These control signals f(di/dt) from control section 30 and the line pressure control signal from line pressure control section 31 are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector level 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and driven pulley speed signals Ns. from driven pulley speed sensor 22 for determining driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by signals of the throttle valve opening degree $\theta$, driven pulley speed signal Ns., and driving positions of the D-range and R-range.

The drag mode providing section 36 decides a small drag current when the accelerator pedal 27 is released at a low speedin each drive position for providing a drag torque to the clutch 2 for a smooth start of the vehicle.

The clutch lock-up engage mode providing section 37 decides a lock-up current in response to the driven pulley speed signal Ns. and throttle opening degree $\theta$ at each drive position for entirely engaging the clutch 2. Outputs of sections 35, 36 and 27 are applied to the output deciding section 33 to control the clutch current. A range of each mode is shown is FIG. 3.

Figure 3:
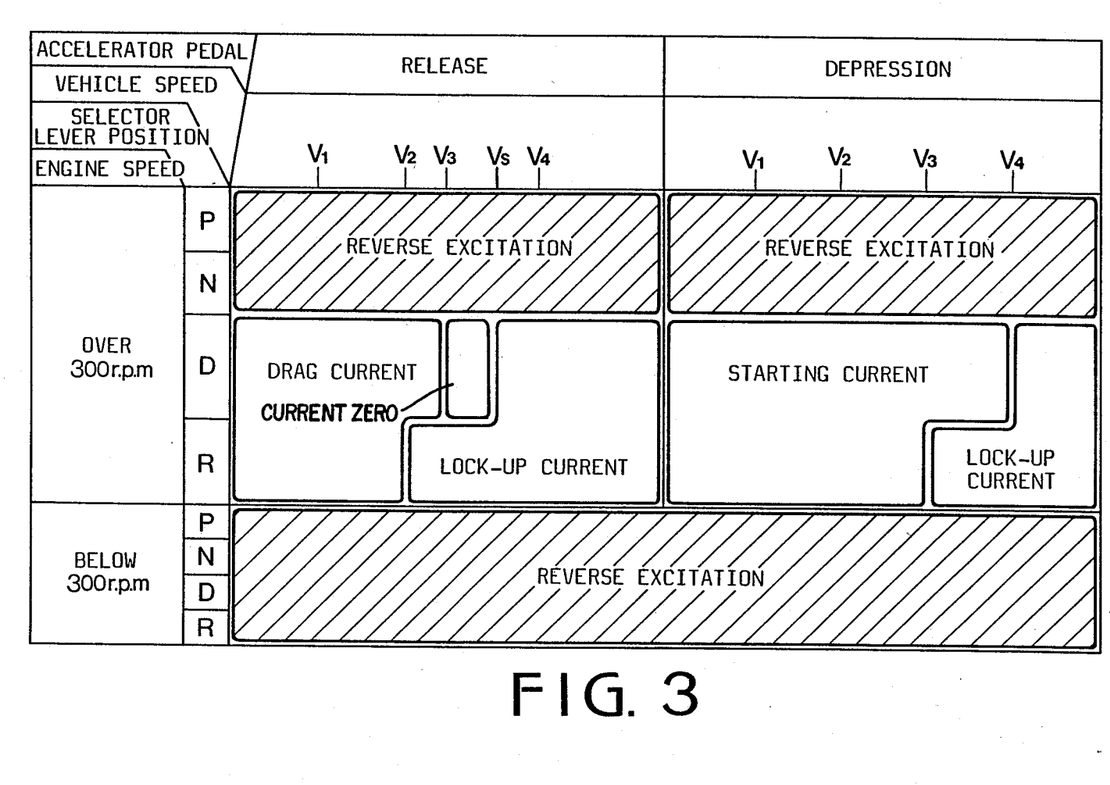
FIG. 3 is a graph showing regions of various modes.
Figure 4:
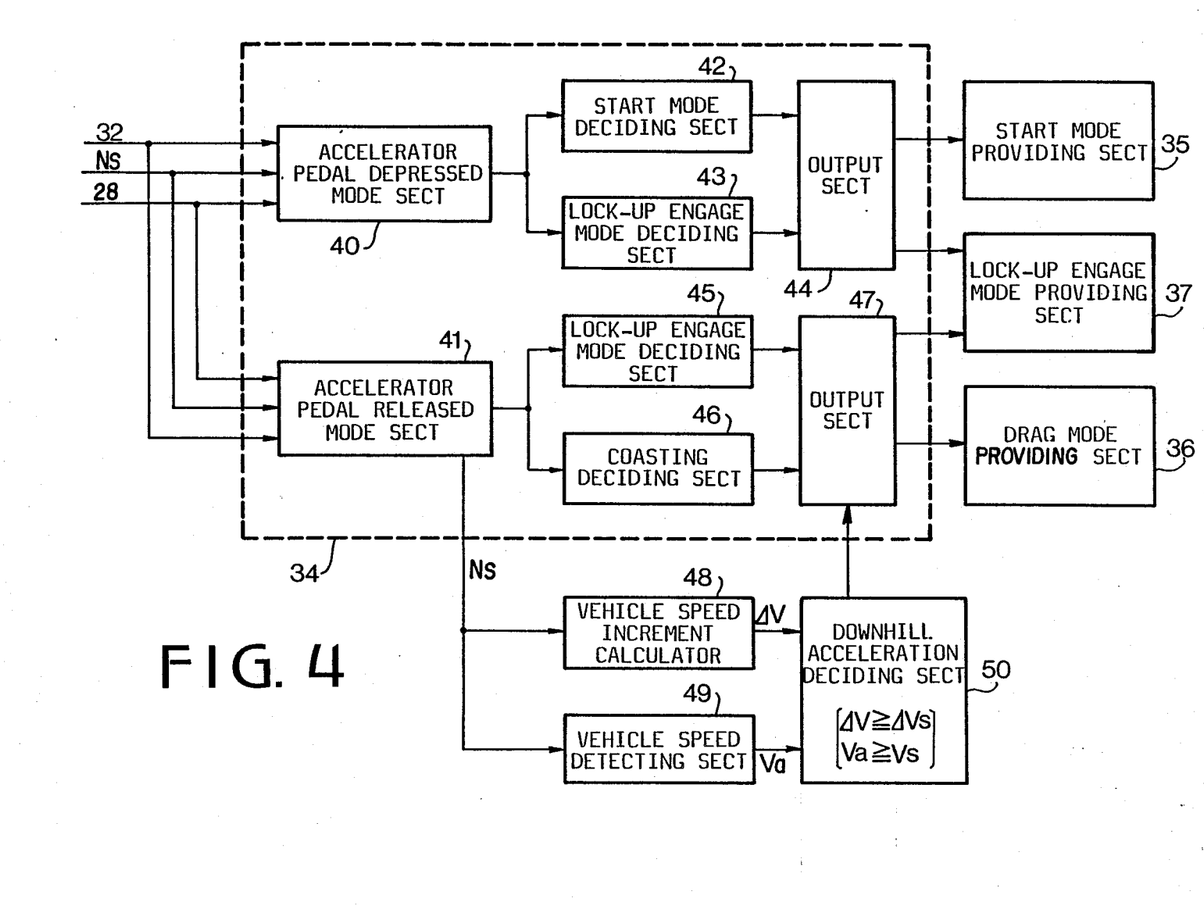
FIG. 4 is a block diagram of a main part of the system according to the present invention.

Referring to FIG. 4, the clutch current mode deciding section 34 is provided with an accelerator pedal depressed mode section 40 and an accelerator pedal released mode section 41, each applied with output signals of accelerator pedal switch 28 driven pulley speed signals NS. and the output signal of reverse excitation mode deciding section 32. The accelerator pedal depressed mode section 40 is connected to a start mode deciding section 42 and lock-up engage mode deciding section 43. The mode is decided depending on whether the vehicle speed V obtained from the driven pulley speed signal NS is higher or lower than a predetermined vehicle speed $V_4$ at which a lock-up curent flows in the coil as shown in FIG. 3. Accordingly, respective output signals of the sections 42 and 43 are applied to the start mode providing section 35 and lock-up engage mode providing section 37 through an output section 44. The accelerator pedal released mode section 41 is connected to a lock-up engage mode deciding section 45 and coasting deciding section 46. When a vehicle speed is below the predetermined speed $V_4$, the coasting deciding section 46 applies an output signal to the drag mode providing section 36 through an output section 47. When the vehicle speed is higher than the predetermined speed $V_4$, the lock-up engage mode providing section 37 is selected.

The acclerator pedal released mode section 41 is connected to a vehicle speed detecting section 49 and a vehicle speed increment calculator 48. The output signal of the calculator 48 that is vehicle speed increment $\Delta V$ and the output signal of the vehicle speed detecting section 49, that is a present vehicle speed Va, are supplied to a downhill acceleration deciding section 50. When the increment $\Delta V$ of vehicle speed is larger than a predetermined value $\Delta V_S (\Delta V \geq \Delta V_S)$ and the vehicle speed Va is higher than a predetermined value $V_S$ which is lower than $V_4 (V_A \geq V_S)$, it is determined that the vehicle is in downhill acceleration state at section 50. In response to the output signal of the section 50, the lock-up engage mode providing section is selected to lock-up the clutch.

Figure 5:
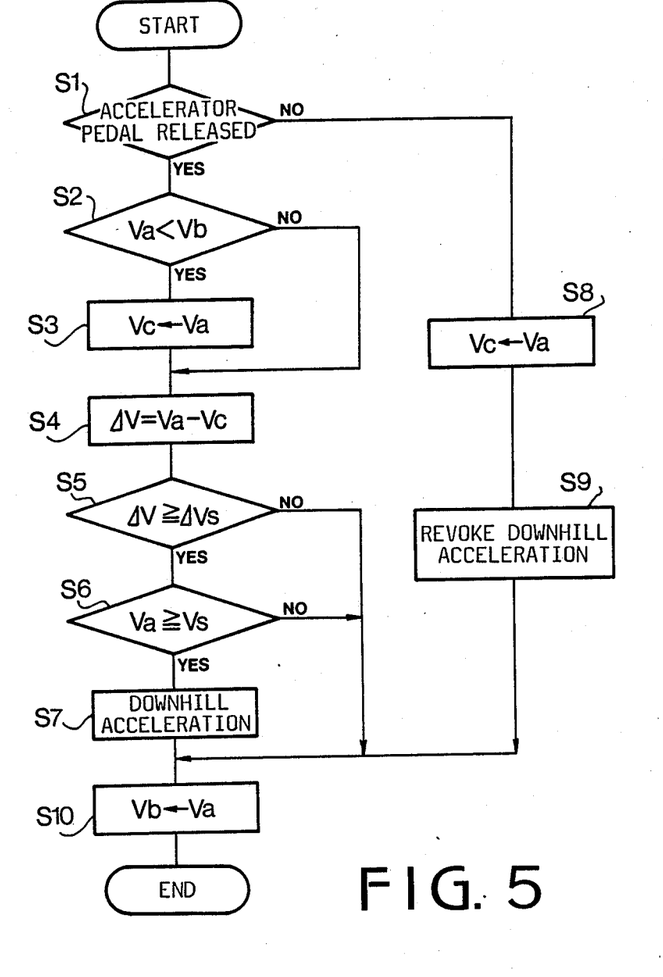
FIG. 5 is a flow chart showing the operation of the system.

Describing the operation of the system with reference to FIG. 5, the program is repeated at regular intervals. At a step S1, it is detected whether the accelerator pedal is released. If it is detected at the step S1 that the accelerator pedal is depressed, the present speed $V_a$ is set as an acceleration start vehicle speed $V_c$ at a step S8 for the next cycle of the program and the decision of the downhill acceleration state is cancelled if any at step S9. If the accelerator pedal is released, a present vehicle speed $V_a$ and a vehicle speed $V_b$ at the last program are compared with each other at a step S2. When the present vehicle speed $V_a$ is lower than the previous speed Vb, the present speed $V_a$ is set as acceleration start vehicle speed $V_c$ at a step S3 for the next cycle of the program. When the present speed $V_a$ is higher, the program directly advances to a step S4, where the increment $\Delta V$ of vehicle speeds is calculated from the formula $\Delta V = V_a - V_c$ (Vc is the acceleration start vehicle spe4ed set at the last cycle of the program). At a step S5, the increment $\Delta V$ is compared with the predetermined value $\Delta V_s$. If $\Delta V$ is larger than the $\Delta V_s$, the present vehicle speed $V_a$ is compared with the predetermined speed $V_s$. When the present speed is higher $(V_a \geq V_s)$, it is determined that the vehicle is in the downhill acceleration state at a step S7. Thus, the clutch is locked up, so that the engine braking is effected. At a step S10, the present vehicle speed $V_a$ is set as the last vehicle speed $V_b$ for the next cycle of the program.

Figure 6:
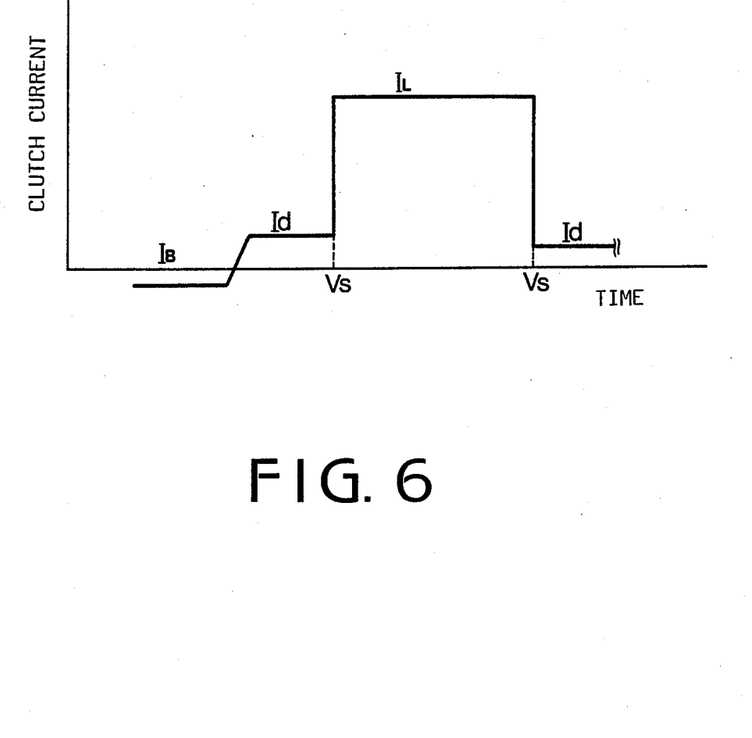
FIG. 6 is a graph showing variation of clutch current.

Referring to FIG. 6, wherein the characteristic of the clutch current in accordance with the hereinbefore described operation is shown. At the start of the vehicle, when D-range or R-range is selected, a reverse current $I_B$ becomes a small drag current $I_d$. On downhill, the vehicle is started without depressing the accelerator pedal in drag current mode and the vehicle is accelerated. When the vehicle speed exceeds the predetermined low speed $V_s$, and step S5 detects condition YES the lock-up engage mode is selected so that a lock-up current $I_L$ continues flowing as long as the vehicle speed increases and step S5 detects condition YES or vehicle speed exceeds $V_4$. When the vehicle speed decreases below the speed $V_s$, the drag mode is selected so that the drag current $I_d$ flows again.

On the other hand, when the accelerator pedal is depressed, the downhill acceleration state is cancelled and clutch current for starting the vehicle or lock-up current flows in dependency on the vehicle speed.

It will be understood that the present invention may be applied to other automatic clutches besides electromagnetic clutches.

According to the present invention, the clutch is entirely engaged when the vehicle is accelerated while coasting downhill. Thus, a sufficient engine braking effect can be provided to increase safety. Furthermore, under other driving conditions, both a suitable engine braking effect and coasting effect can be properly obtained by selecting proper clutch current.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a clutch for a motor vehicle having vehicle speed detecting means for producing a vehicle speed signal dependent on vehicle speed, wherein the clutch is engaged for locking-up the clutch when said vehicle is accelerated up to a first reference speed , the system comprising:

first detecting means for detecting release of an accelerator pedal of the vehicle and for producing a release signal;

second detecting means for detecting acceleration of the vehicle during existence of the release signal and for producing an acceleration signal when an increment of change of the vehicle speed represented by said vehicle speed signal is larger than a predetermined value;

third detecting means for detecting downhill acceleration and for producing a downhill acceleration signal when the vehicle is accelerated at least up to a second reference speed, which is set lower than the first reference speed, during existence of the acceleration signal; and engaging means responsive to the downhill acceleration signal for locking-up the clutch.

2. The system according to claim 1 wherein the clutch is an electromagnetic clutch.

3. The system according to claim 2, wherein the engaging means responsive to said downhill acceleration signal is for controlling current passing through a coil of the electromagnetic clutch.

4. The system according to claim 1 wherein
   said second detecting means includes means for determining said increment of change of the vehicle speed as the difference between the present vehicle speed and an acceleration start vehicle speed.

5. The system according to claim 4, further comprising
   means for setting the acceleration start vehicle speed to present value of the vehicle speed when the accelerator pedal is released during deceleration of the vehicle, and when the accelerator is depressed.

6. The system according to claim 4, wherein
   said engaging means is responsive to said downhill acceleration signal for locking-up said clutch above said second reference speed with said accelerator pedal released.

* * * * *